Nov. 12, 1929.          H. M. WILLIAMSON          1,735,702
                          VEGETABLE CUTTER
                         Filed Aug. 7, 1928          2 Sheets-Sheet 1
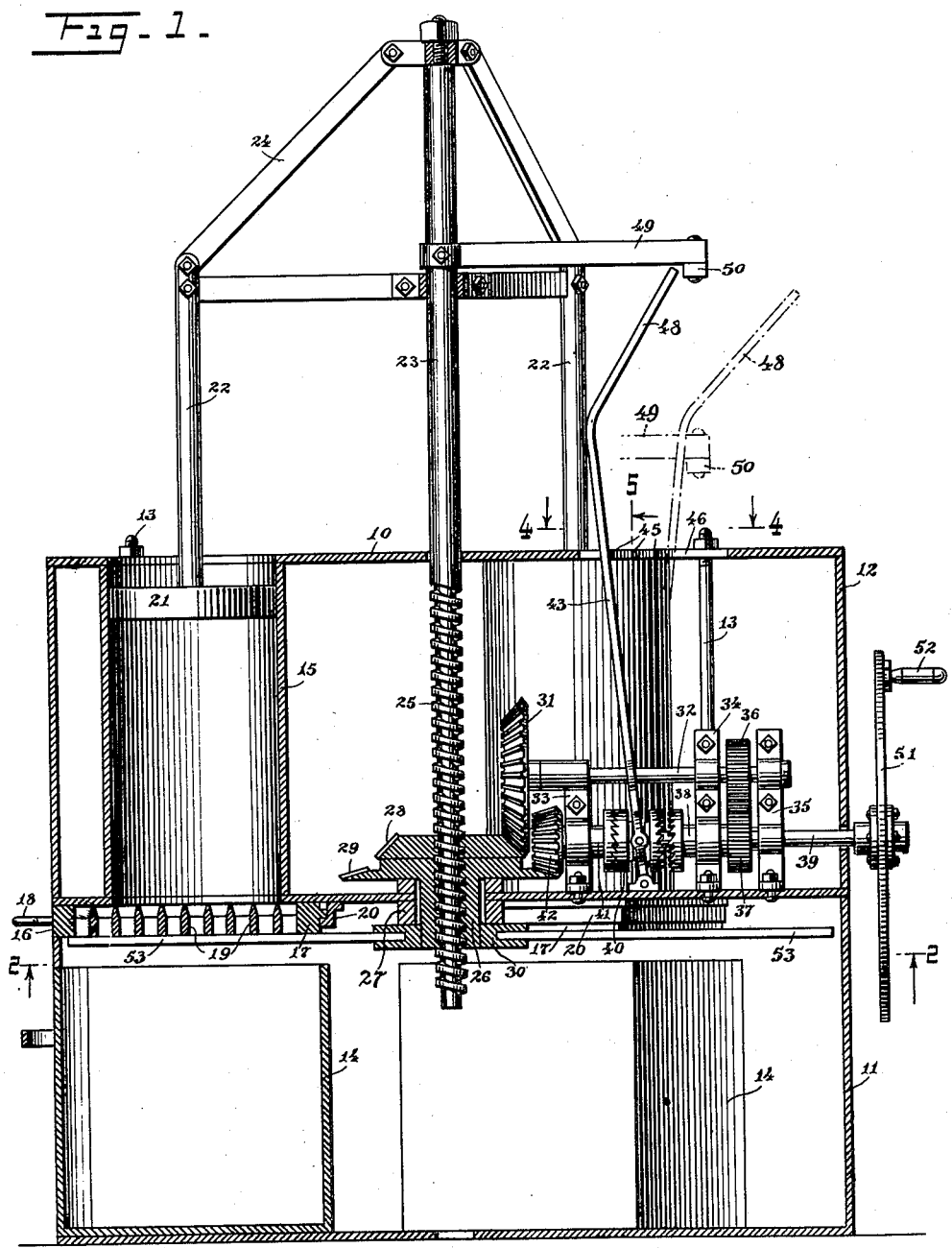
WITNESSES
Jos. L. Lamia
Chris Feinle
INVENTOR
Harry M. Williamson
BY
Munn & Co.
ATTORNEY Nov. 12, 1929.  H. M. WILLIAMSON  1,735,702
VEGETABLE CUTTER
Filed Aug. 7, 1928   2 Sheets-Sheet 2
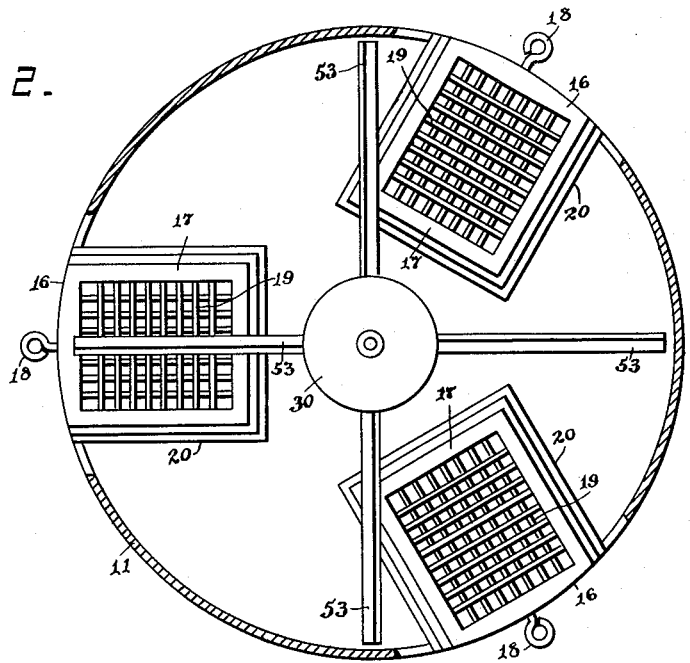
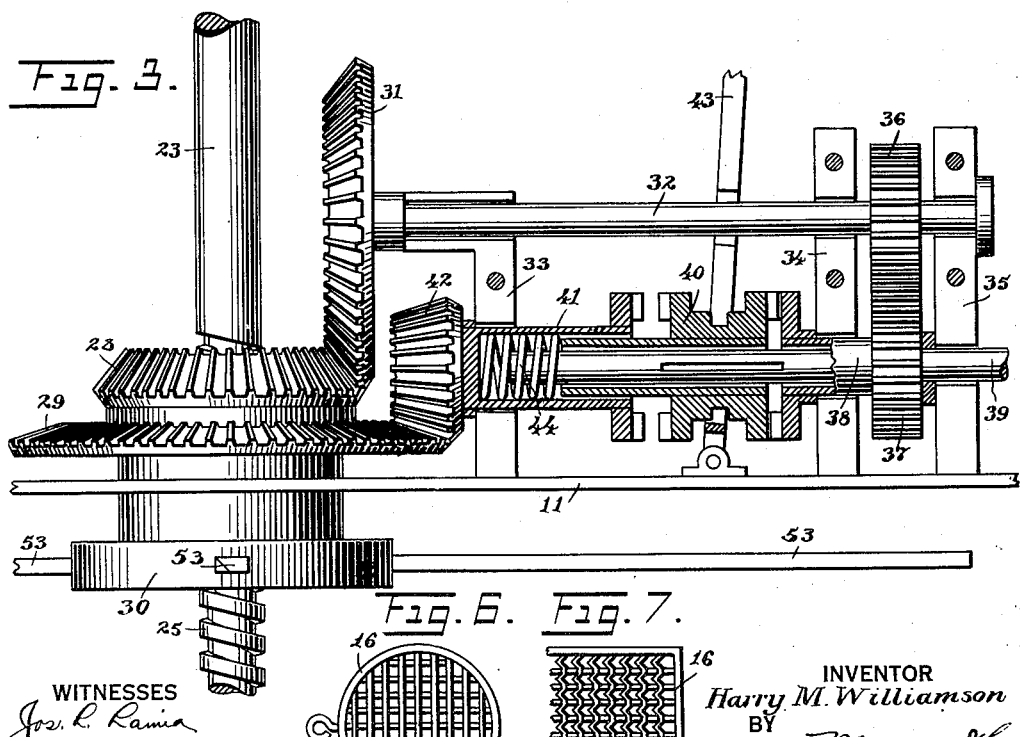
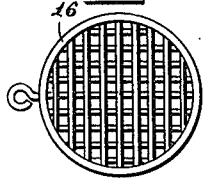
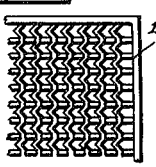
INVENTOR
Harry M. Williamson
BY
ATTORNEY Patented Nov. 12, 1929

1,735,702

UNITED STATES PATENT OFFICE

HARRY M. WILLIAMSON, OF McCLEARY, WASHINGTON

VEGETABLE CUTTER

Application filed August 7, 1928. Serial No. 298,068.

This invention relates to a machine for cutting, chopping or mincing vegetables and fruits.

The principal object of the invention is the provision of a comparatively large capacity machine of the indicated character, embodying improved features of construction and operation, whereby vegetables or fruits may be cut, chopped or minced in an expeditious manner.

With the foregoing and other objects in view, the invention resides in the particular combination, relative disposition, and operation of the parts hereinafter fully described and illustrated in the accompanying drawings, in which—

Figure 1 is a sectional elevation of a machine embodying the features of the invention.

Fig. 2 is a sectional view taken approximately on the line 2—2 of Fig. 1 and looking in the direction indicated by the arrows.

Fig. 3 is an enlarged sectional view of the automatic clutch and related parts.

Fig. 4 is a detail sectional view taken on the line 4—4 of Fig. 1 and looking in the direction indicated by the arrows.

Fig. 5 is a detail sectional view taken on the line 5—5 of Fig. 1.

Figs. 6 and 7 show additional forms of cutters.

Referring now more particularly to the drawings, it will be apparent that the machine includes a casing consisting of a lower section 11 and an upper section 12 bolted to the lower section 11 by bolts 13. The lower section 11 is provided with a plurality of receptacles or drawers 14, there being three in the present instance. The upper section 12 is provided with cylinders 15 respectively in vertical alignment with the drawers 14, it being apparent that the drawers 14 and the cylinders 15 are arranged radially with respect to the vertical axes of the casing sections 11 and 12. Arranged between the lower end of each cylinder 15 and its related drawer 14 is a cutter 16. The cutters 16 may be of various designs for the purpose of producing strips of different shapes out of the vegetables or fruits subjected thereto. Each cutter 16 consists of a frame 17 having a handle 18, and cutting members 19. The frame 17 of the cutter is received in a suitable holder 20 on the lower casing section 11. The construction and arrangement is such that each of the cutters 16 may be readily inserted in operative position, and may also be readily removed. Plungers 21 are arranged respectively for up and down movement in the cylinders 15 for the purpose of forcing the vegetables or fruits through the cutters 16.

In order to move the plungers 21 up and down there is provided mechanism presently to be described. Each plunger 21 is provided with a rod 22, and each rod 22 is rigidly connected with the upper end of a shaft 23 by a truss structure 24. Substantially the lower half of the shaft 23 is threaded as at 25. The threaded section of the shaft 23 is in threading engagement with a rotor 26 mounted for rotatory movement in a bearing 27 on the casing section 11 axially thereof. The rotor 26 is provided with bevel gears 28 and 29 on the upper end thereof, and a head 30 on the lower end. A bevel gear 31 meshes with the gear 28. The gear 31 is fast on a shaft 32 rotatable in bearings forming parts of blocks 33, 34 and 35 rigidly secured to the casing section 11. A gear 36 fast on the shaft 32 meshes with a gear 37 fast on one end of a clutch element 38. The element 38 is loosely arranged on a drive shaft 39, and said element 38 is rotatable in a bearing forming a part of the block 34. A clutch element 40 is arranged on the shaft 39, is rotatable therewith, and is slidable longitudinally thereof. A clutch element 41 is rotatable in a bearing forming a part of the block 33. One end of the clutch element 41 has fast thereon a bevel gear 42 which meshes with the bevel gear 29. The clutch element 40 is adapted to coact with the clutch elements 38 and 41 by moving the clutch element 40 into and out of coacting engagement with the said clutch elements 38 and 41. This is acomplished by a lever 43 positioned on the casing section 11, the said lever 43 being in cooperative engagement with the clutch element 40. The spring 44 is arranged in a bore in the clutch element 41 and has a normal tendency to urge the clutch element 40 into engagement with the clutch element 38. In order to hold the clutch element 40 in engagement with the clutch element 41 against the action of the spring 44 there is provided a series of teeth 45 on one of the walls of a slot 46 in the top of the casing section 12. The lever 43 extends through the slot 46 and is in engagement with one of the teeth 45. The lever 43 is flexible in order to be moved into and out of engagement with the teeth 45. The lever 43 is provided with a cam 47, and the upper end of the lever 43 is bent at an angle to present a cam portion 48. The shaft 23 has rigidly secured thereto a laterally extending arm 49 which coacts with the cam 47 on the lever 43 in the downward movement of the shaft 23, for the purpose of disengaging the lever 43 with the particular tooth 45, so that the spring 44 will move the clutch element 40 into cooperative engagement with the clutch 38. Upon the upward movement of the shaft 23, a member 50 rigidly secured to the arm 49 at right angles with respect thereto encounters the cam portion 48 of the lever 43 to move the latter into engagement with one of the teeth 45, and incidentally moves the clutch element 40 into cooperative engagement with the clutch element 41. The drive shaft 39 has a crank disk 51 which is provided with a handle 52.

In accordance with another feature of the invention, the head 30 of the rotor 26 is provided with radial cutting blades 53 which cooperate with the cutters 16 in the rotation of the rotor 26, for the purpose of cutting the strips which leave the cutters 16 into small pieces, which drop into the drawers 14 and any number of cutting blades 53 may be employed depending upon the length of the pieces desired.

When the plungers 21 are in the up positions, the vegetables or fruits may be placed in the cylinders 15. At this time the lever 43 is in a position to put the clutch element 40 in cooperative engagement with the clutch element 41, and with the lever 43 in engagement with one of the teeth 45. By operating the crank disk 51 with the handle 52 motion will be transmitted to the rotor 26, through the intervention of the shaft 39, clutch elements 40 and 41, and gears 42 and 29. This will cause the shaft 23 to move downwardly, and through the intervention of the truss structure 24 and the rods 22, the plungers 21 will be moved downwardly in their cylinders, forcing the vegetables or fruits through the cutters 16 to be cut into strips, the strips being cut by the blades 53 into smaller pieces which drop into the drawers 14, which may be withdrawn readily to be emptied in suitable receptacles. As the plungers 21 reach the downward limit of their movement, the arm 49 encounters the cam 47 on the lever 43 flexing the same to a position in which the spring 44 of the clutch may come into play for the purpose of sliding the clutch element 40 out of engagement with the clutch element 41 and into engagement with the clutch element 38. Motion will then be transmitted from the shaft 39 to the rotor 26 in an opposite direction through the intervention of the gears 37 and 36, shaft 32, and gears 31 and 28, causing the shaft 23 to move upwardly, it being apparent that the plungers 21 will also be moved upwardly out of their cylinders 15. The ratio of the gears 31 and 28 as compared with that of the gears 42 and 29 is such that the shaft 23 and therefore the plungers 21 will travel upwardly approximately four times faster than they move downwardly. In the upward movement of the shaft 23, there comes a time when the member 50 encounters the cam portions 48 of the lever 43, to move the latter in its other position for the purpose of moving the clutch element 40 out of engagement with the clutch element 38 and into engagement with the clutch element 41, it being understood that there is sufficient lost motion between the parts to permit of this result being accomplished. In this manner the machine may be constantly kept in operation to expeditiously cut, chop or mince any quantity of vegetables or fruits.

It is to be understood that the invention is not restricted to the precise arrangement of parts shown and described, as details of construction may be modified and rearranged without departing from the spirit of the invention, the scope of which is limited only by the terms of the appended claims.

I claim:

1. In a machine of the class described, in combination, cylinders, a cutter at the bottom of each cylinder, a plunger movable up and down in each cylinder, a screw rigidly connected with said plungers, a rotor, a fixed bearing for the rotor, said rotor being adapted to coact with said screw to impart up and down axial movement to said screw, to move said plungers up and down, a plurality of independent driven devices for rotating said rotor in opposite directions, driving means, a clutch interposing said driven devices and said driving means, and means controlled by the axial movement of said screw, to operate the clutch, to alternately couple and uncouple said driving means and driven devices, to cause the up and down axial movement of said screw.

2. In a machine of the class described, in combination, cylinders, a cutter at the bottom of each cylinder, a plunger movable up and down in each cylinder, a screw rigidly connected with said plungers, a rotor, a fixed bearing for the rotor, said rotor being adapted to coact with said screw to impart up and down axial movement to said screw, to move said plungers up and down, a plurality of independent driven devices for rotating said rotor in opposite directions, driving means, a spring clutch interposing said driven devices and said driving means, said clutch acting normally to couple said driving means with one of said driven devices to effect the upward axial movement of said screw to move said plungers upwardly in response to the operation of the driving means, and means controlled by the upward axial movement of said screw, to operate said clutch, to uncouple the normally coupled driven device from the driving means and to couple the other driven means with said driving means, to cause the downward axial movement of said screw, to move said plungers downwardly in response to the operation of said driving means.

3. In a machine of the class described, in combination, cylinders, a cutter at the bottom of each cylinder, a plunger movable up and down in each cylinder, a screw rigidly connected with said plungers, a rotor, a fixed bearing for the rotor, said rotor being adapted to coact with said screw to impart up and down axial movement to said screw, to move said plungers up and down, a plurality of independent driven devices for rotating said rotor in opposite directions, driving means, a clutch interposing said driven devices and said driving means, a clutch lever, and coacting means on the screw and clutch lever to actuate said clutch lever, to operate the clutch, to alternately couple and uncouple said driving means and driven devices, to cause the up and down axial movement of said screw.

HARRY M. WILLIAMSON.